June 19, 1962 N. E. LINDENBLAD 3,040,113
THERMAL POWER GENERATING SYSTEM
Filed June 4, 1959 3 Sheets-Sheet 2

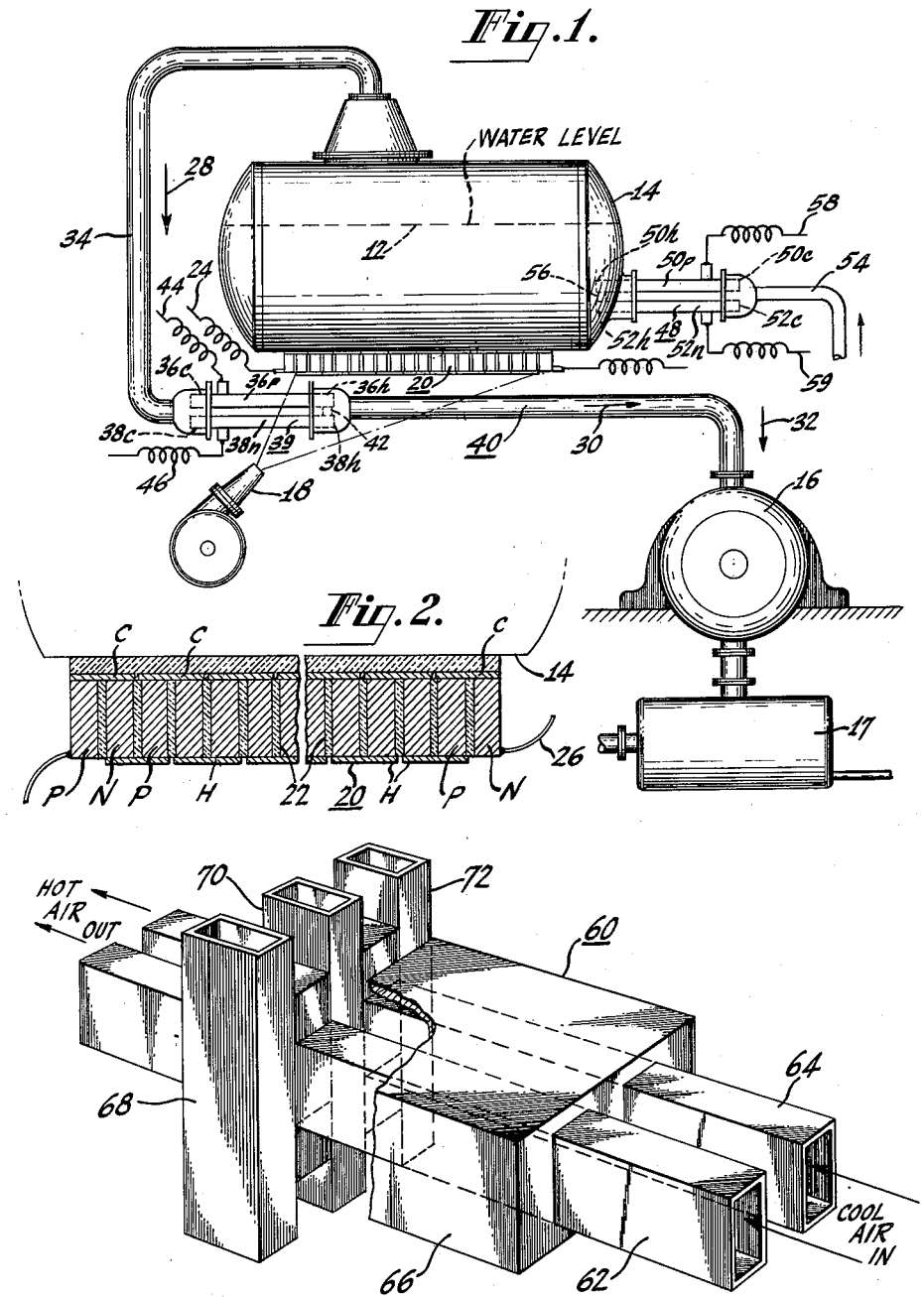

INVENTOR.
NILS E. LINDENBLAD
BY
ATTORNEY

INVENTOR.
NILS E. LINDENBLAD

United States Patent Office 3,040,113
Patented June 19, 1962

3,040,113
THERMAL POWER GENERATING SYSTEM
Nils E. Lindenblad, Princeton, N.J., assignor to Radio Corporation of America, a corporation of Delaware
Filed June 4, 1959, Ser. No. 818,145
18 Claims. (Cl. 136—4)

This invention relates generally to power generating systems employing thermal energy, and more particularly to the combination with such a system, in a novel arrangement therewith, of one or more thermoelectric power generating adjuncts for improving the over-all efficiency and/or practicability of such a system.

As used in this specification, the term "thermal power converting system" or "thermal power generating system" is intended to include any form of power generator or converter which utilizes a movable heat conveying medium, such as a liquid or a gas, as well as a thermoelectric power converter in which no movement of any of the elements thereof is involved in the course of its operation to convert heat energy into electrical energy, and vice versa.

Systems formerly in use for generating electricity involve, for example, the use of steam for operating a turbine, which, in turn, drives an electric generator. In systems of this sort, an appreciable amount of the thermal energy is lost or wasted, so that the efficiency of such systems leaves something to be desired. It has also been proposed heretofore to convert heat energy to electrical energy by thermoelectric means. Such a direct conversion, however, is also relatively inefficient with presently known thermoelectric materials.

Accordingly, it is an object of the present invention to provide means for increasing the over-all power efficiency of a system for converting thermal energy into another form of energy.

It is another object of the present invention to provide a novel arrangement of thermoelectric means in a thermal system in a manner to minimize the normal conduction of heat from the hot end to the cold end of the thermoelectric means.

Still another object of the present invention is to provide, as an adjunct to a thermal power generating system, one or more thermoelectric power generating devices arranged in such a manner as to provide enhanced over-all efficiency of the system.

A further object of the present invention is to provide an adjunct as aforesaid which can be applied readily to existing thermal power generating systems without requiring extensive alteration of the latter.

In accordance with the present invention, use is made, in a thermally responsive power generating or power converting system, of one or more thermoelectric power converters as adjuncts to the aforesaid system to form an over-all system of increased efficiency. By arranging the thermoelectric power converting adjunct in the thermal system to convert at least the part of the available, but normally lost, heat energy into electricity, thereby restricting a rise in the entropy of the system, the over-all power converting efficiency of the system may be increased. This is accomplished by the strategic positioning of thermoelectric power generating means at one or more places in the thermal system where thermal gradients exist. For example, in a thermal system for generating steam to operate a turbine, a thermoelectric power generator can be disposed with its hot end adjacent to the primary source of heat and its cold end adjacent to the boiler to be heated. Another combination of thermoelectric means in this thermal system, in accordance with the present invention, is one wherein thermoelectric means are positioned in a portion of the path of this steam where a temperature gradient exists and wherein the cold end of the thermoelectric means is in front of the end of the thermoelectric means with respect to the direction of flow of steam from the boiler to the turbine. A suitable temperature gradient, wherein the lower temperature is in front of the relatively higher temperature with respect to the direction of flow of the heat conveying medium, occurs at a station in this thermal system where, for example, a superheater is employed. Another suitable temperature gradient in this thermal system where the lower temperature is in front of the higher temperature with respect to the flow of the heat conveying medium occurs at the fluid inlet to the boiler.

In another embodiment of the present invention, thermoelectric means are arranged in a temperature gradient portion of a gas duct in a manner whereby the flow of gas is substantially unimpeded and wherein the cold end of the thermoelectric means is in front of the hot end with respect to the flow of gas in the duct.

In a further embodiment of the present invention, at least one adjunctive thermoelectric power generator is placed in the path of the heat conveying medium of the thermal system. The heat conveying medium flows through the adjunctive generator from its cold end to its hot end and ultimately through a terminal thermoelectric power generator in a direction from the latter generator's hot end to its cold end.

The novel features of the present invention, both as to its organization and methods of operation, as well as additional objects and advantages thereof, will be understood more readily from the following description, when read in connection with the accompanying drawing in which similar reference characters designate similar parts, and in which:

FIG. 1 is a schematic drawing of a thermal system for producing steam for a turbine and showing thermoelectric means arranged in the system in accordance with the present invention;

FIG. 2 is an enlarged cross-sectional view of one form of thermoelectric power generator which may be used in the system of FIG. 1, and which employs a series connected chain of thermoelectric elements;

FIG. 3 is a fragmentary, perspective view, with parts broken away, of another embodiment of the invention involving a thermal system for heating a gas and for combination with thermoelectric adjuncts for increasing the over-all efficiency of the system;

Figure 6:
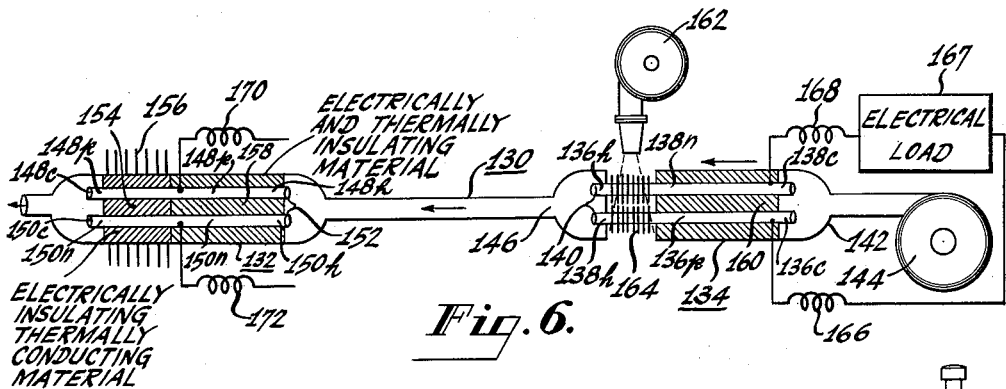
Figure 7:
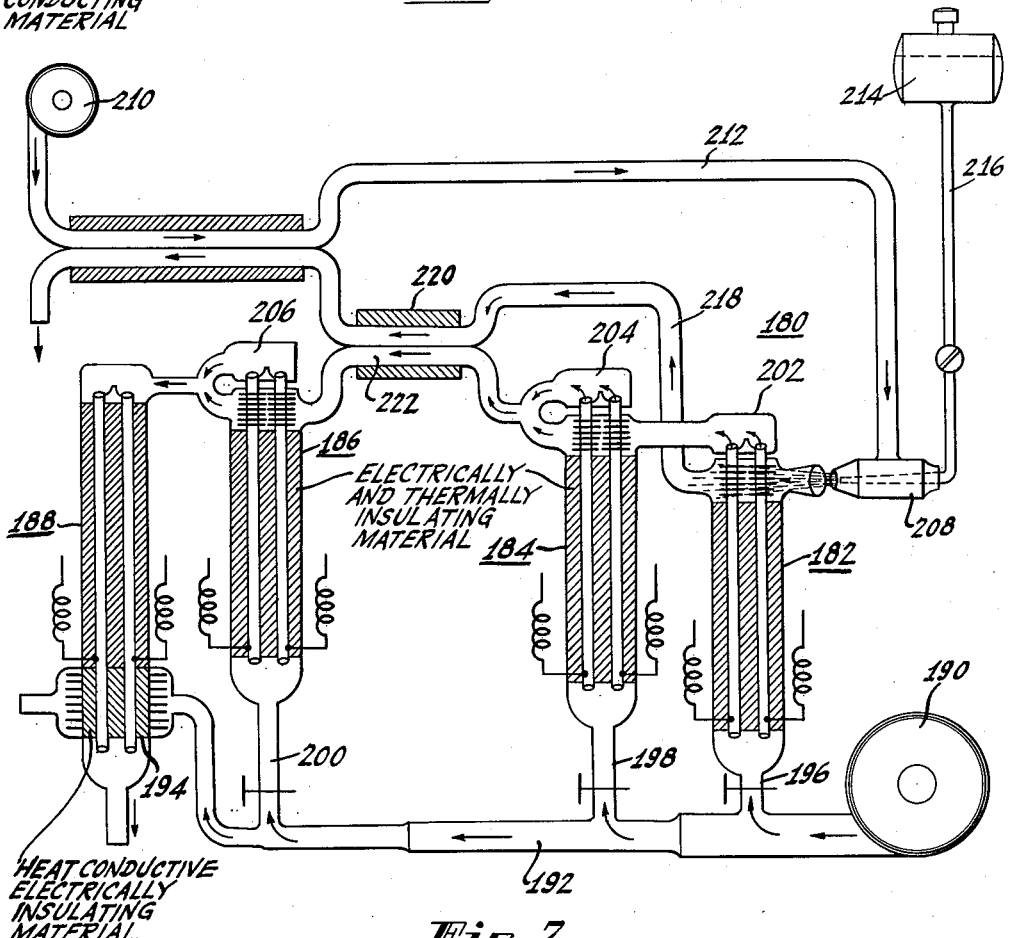

FIG. 6 is a schematic diagram of still another embodiment of a thermal system, in accordance with the present invention, wherein one thermoelectric power generator is arranged as an adjunct to a terminal thermoelectric power generator; and FIG. 7 is a schematic diagram of a further embodiment of a thermal system, in accordance with the present invention, wherein a plurality of thermoelectric power generating adjuncts are employed in a novel combination with a terminal thermoelectric power generator.

Referring, now, to FIG. 1, there is shown a schematic drawing of a thermal system 10 whose over-all efficiency may be increased by combining thermoelectric power generating adjuncts therewith. The thermal system 10 is one for generating steam from water 12 in a boiler 14 to operate a steam utilization device, such as a turbine 16. The water 12 in the boiler 14 may be heated by a primary source of heat, such as an oil burner 18. The burner 18 is disposed to direct its flame toward the bottom of the boiler 14.

A thermoelectric power generating unit 20 is disposed between the burner 18 and the bottom of the boiler 14. The thermoelectric unit 20 comprises a plurality of alternately disposed, parallelly aligned, and serially connected, p-type thermoelectric elements P and n-type thermoelectric elements N, as shown in FIG. 2. The elements P and N are insulated from each other by any suitable insulating material, such as vitreous or ceramic insulating compounds 22. The ends of the elements P and N that are adapted to be disposed in the relatively cooler station of a thermal gradient of a thermal system are connected serially to each other by means of good electrical conductors, such as copper strips C. The junctions formed by the copper strips C and the elements of the thermoelectric unit 20 will hereinafter be called the cold end of the thermoelectric means. The ends of the elements P and N that are adapted to be disposed at a hot station in a thermal gradient are also serially connected to each other by means of good electrical conductors, such as copper strips H. The junctions formed by the copper strips H and the thermoelectric elements will hereinafter be referred to as the hot end of the thermoelectric means.

Examples of suitable p-type thermoelectric elements P may comprise alloys of iron, aluminum, and molybdenum, or of iron, aluminum and vanadium, and p-type lead telluride. Suitable n-type thermoelectric materials may be selected from alloys of lead and tellurium, silver and tellurium, copper and nickel, iron and nickel, and gold and nickel to name a few.

Electrical conductors 24 and 26 are connected to the outer thermoelectric elements P and N for deriving an output voltage from the thermoelectric unit 20, in accordance with the well known thermoelectric effect. It will now be understood that if the thermoelectric unit 20 is disposed with its cold end C adjacent to, but insulated electrically from, the boiler 14 and its hot end H adjacent to the flame from the burner 18, a voltage can be derived between the conductors 24 and 26.

The steam formed within the boiler 14 from the water 12 is conducted along a confined path, in the direction of the arrows 28, 30, and 32, to the turbine 16. The steam is first conducted through a conduit 34 to a point near the burner 18. The conduit 34 connects with two parallelly disposed and separated conduits 36p and 38n. The conduits 36p and 38n respectively comprise p-type and n-type thermoelectric elements having cold ends 36c and 38c and hot ends 36h and 38h. The cold ends 36c and 38c of the thermoelectric elements communicate with the conduit 34 and are held therein by any suitable electrical insulating binder. The hot ends 36h and 38h of the thermoelectric elements communicate with a conduit 40 that leads to the turbine 16. The hot ends 36h and 38h are electrically connected to each other by an electrical conductor 42, and are fixed within the conduit 40 by any suitable electrical insulating binder. The steam outlet from the turbine 16 is connected to a condenser 17 in accordance with a practice well known in the art.

The burner 18 is disposed to direct its flames upon the hot ends 36h and 38h of the thermoelectric elements 36p and 38n, respectively. Thus, the burner 18 functions as a superheater at this station for the steam traveling from the boiler 14 to the turbine 16.

It will now be understood that the thermoelectric elements 36p and 38n, electrically connected by the conductor 42, form a thermoelectric power generating unit 39 that will develop a voltage when there is a difference in temperature between the cold end and the hot end. Since the steam from the water 12 may leave the boiler 14 at a temperature of about 130 degrees C., and since the steam may be heated to a temperature of about 400 degrees C. by the superheater action of the burner 18, it will be understood that a voltage will be produced by the thermoelectric unit 39. This voltage may be derived for utilization by any voltage utilization means (not shown) by means of conductors 44 and 46 electrically connected to the cold ends 36c and 38c of the thermoelectric elements 36p and 38n, respectively.

A thermoelectric power generating unit 48, comprising a p-type conduit element 50p, and a parallelly disposed n-type conduit element 52n, may be placed between a fluid intake conduit 54 and the boiler 14. The cold ends 50c and 52c of the thermoelectric unit 48 communicate with the conduit 54 and are fixed thereto by any suitable electrical insulating binders or fittings. The hot ends 50h and 52h of the thermoelectric unit 48 are electrically connected to each other by an electrical conductor 56 and communicate with the boiler 14. The cold end of the thermoelectric unit 48 may be said to comprise the ends 50c and 52c of the thermoelectric elements 50p and 52n. The ends 50h and 52h of the thermoelectric elements 50p and 52n will be referred to collectively as the hot end of the thermoelectric unit 48. It will now be understood that, since the incoming water to the boiler 14 is cooler than the heated water within the boiler 14, the difference in temperature between the hot and cold ends of the thermoelectric unit 48 develops a voltage across the thermoelectric unit. This voltage may be applied to voltage utilization means (not shown) through electrical conductors 58 and 59 connected to the thermoelectric elements 50p and 52n, respectively.

It will be seen, from the foregoing, that there are provided three thermoelectric power generating adjuncts 20, 39, and 48 in combination with a thermal system 10 which provides steam for a steam utilization device, such as the turbine 16. The thermoelectric unit 20 has been disposed in the temperature gradient provided between the hot flame of the burner 18 and the relatively cooler boiler 14. In the thermoelectric unit 20, there is a tendency for heat to be conducted along the thermoelectric elements P and N to reduce thereby the difference in temperature between the hot and cold ends of the thermoelectric unit. This action tends to decrease the power generation properties of the thermoelectric unit. Each of the thermoelectric units 39 and 48, however, has been arranged in a manner whereby the flow of a heat conducting medium is in a direction from the cold end of the thermoelectric unit to the hot end of the thermoelectric unit, so that any tendency for heat to be conducted from the hot end to the cold end is prevented or materially minimized. This is an important feature of the present invention.

Referring, now, to the thermoelectric generator 39, in FIG. 1, it will be seen that the steam from the conduit 34 will flow from the cold ends 36c and 38c to the hot ends 36h and 38h of the duct-like thermoelectric elements 36p and 38n, respectively. Any tendency for heat to be conducted from the hot ends 36h and 38h to the cold ends 36c and 38c, respectively, will be offset by the counterflow of relatively cold steam from the relatively cold end to the uperheated hot end of the thermoelectric unit 39.

Conduction of heat from the hot end of the thermoelectric unit 48 to the cold end is reduced by the counterflow of the relatively cold water from the duct 54 to the relatively hot water within the boiler 14. Therefore, with respect to both of the thermoelectric units 39 and 48, it may be said that they are disposed in a thermal system with their cold ends in front of their hot ends with respect to the direction of flow of a heat conducting medium in the system.

Figure 4:
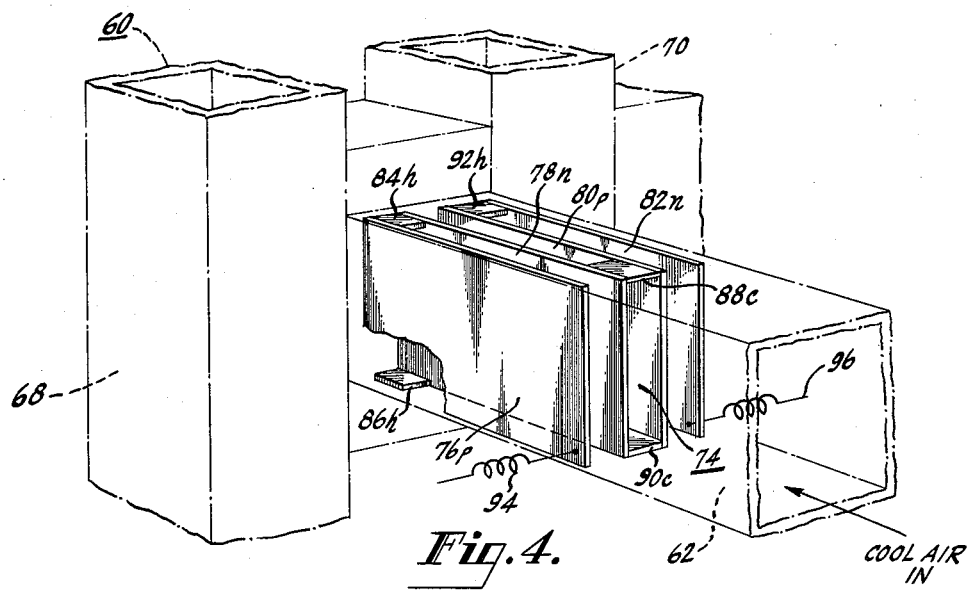
FIG. 4 is an enlarged perspective view of a portion of the thermal system illustrated in FIG. 3, showing a thermoelectric power generating unit disposed in a gas duct in accordance with the present invention.

Referring, now, to FIGS. 3 and 4, there is shown a thermal system 60 wherein the heat conducting medium is a gas, such as air, and wherein thermoelectric means may be arranged to increase the over-all efficiency of this system in accordance with the present invention. Cool air, for example, may be forced through parallelly disposed ducts 62 and 64, in the direction indicated by the appended arrows, by any suitable means, such as a blower (not shown). The ducts 62 and 64 may be thermally insulated from the ambient air by any suitable heat insulating material 66. The ducts 62 and 64 pass between transversely disposed ducts 68, 70, and 72. The ducts 68, 70, and 72 communicate with a source of heat, such as a furnace (not shown), for conducting heated air therethrough. The ducts 62 and 64 are, in a heat exchange relationship with the ducts 68, 70, and 72, so that any air through the ducts 62 and 64 is heated at this station of heat exchange by heat from the ducts 68, 70, and 72. Thus, it will be understood that cool air entering the ducts 62 and 64 is heated at the heat exchange station, adjacent to the ducts 68, 70, and 72, and emerges as hot air for ultimate utilization, as for heating a room, for example.

Referring, now, to FIG. 4, there is shown a thermoelectric power generating unit 74 disposed within the duct 62 as a power generating adjunct for the thermal system 60. The thermoelectric unit 74 comprises a plurality of serially connected, alternately and parallelly disposed p-type and n-type thermoelectric elements 76p, 78n, 80p, and 82n. The p-type element 76p and n-type element 78n are electrically connected at their hot ends by strips 84h and 86h of a conducting material. These connections are made adjacent the upper and lower portions of the hot ends in order to prevent any obstruction of the gas through the duct 62. In a similar manner, the cold ends of the n-type element 78n and p-type element 80p are electrically connected by conducting strips 88c and 90c. The hot ends of the p-type element 80p and the n-type element 82n are electrically connected by an upper conducting strip 92h and a lower conducting strip (not shown). It will now be understood that, when the hot end of the thermoelectric unit 74 is disposed adjacent to the heat exchange station and the cold end is in front of the hot end, with respect to the direction of flow of the air, a voltage is developed across the thermoelectric unit. This voltage may be applied to any voltage utilization means (not shown) by means of conductors 94 and 96 connected to the elements 76p and 82n, respectively. Here, too, it will be noted that the thermoelectric unit 74 is disposed in a temperature gradient portion of a path of a heat conveying medium with its cold end in fornt of its hot end with respect to the direction of flow of the heat conveying medium (air). This novel arrangement retards the conduction of heat from the hot end to the cold end of the thermoelectric unit by the constant absorption of heat by the heat conveying medium and by the conduction of this absorbed heat from the hot end to the ultimate heat utilization means.

Figure 5:
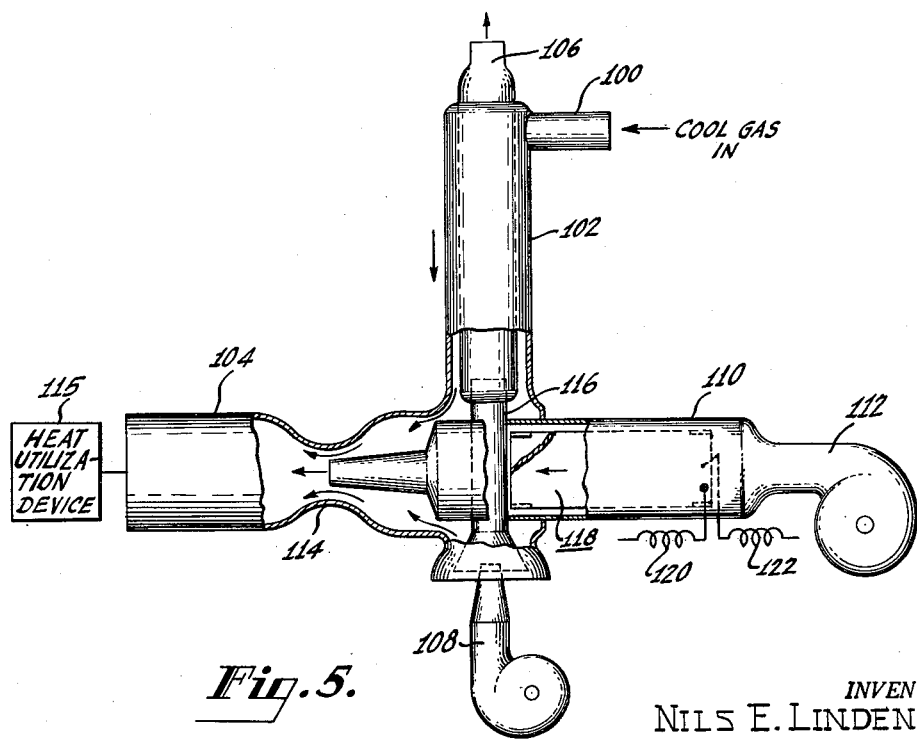
FIG. 5 is a more detailed, schematic view, partly in section, of a modified form of the embodiment shown in FIG. 3 and illustrating a thermal system for imparting heat energy to a gas and of a novel arrangement of a thermoelectric power generating adjunct for the system for increasing the over-all efficiency of the system.

Referring, now, to FIG. 5, the details of a thermal system, somewhat similar to that shown in FIGS. 3 and 4, are illustrated. A gas to be heated is introduced into a conduit 100. This gas then flows into a conduit 102, that communicates with the conduit 100, and out through a conduit 104, that communicates with the conduit 102. A heat conducting conduit 106 is disposed concentrically within the conduit 102 and is spaced from the inner wall of the conduit 102 so as not to impede the flow of the gas. A source of primary heat, such as a burner 108, is disposed at the lower end of a conduit 116 that is in communication with the conduit 106 so that it may direct a hot flame and heated air through the conduit 106. Hence, any relatively cool gas flowing through the conduit 102 is in a counterflow heat exchange relationship with the heated gases within the conduit 106.

A conduit 110 communicates with the conduit 102 and with the conduit 104. With this arrangement, a blower 112 may blow air, or some other gas, into the conduit 104. The conduit 104 is formed with a venturi restriction 114 adjacent to a restricted outlet of the conduit 110. Air or other gas from the conduit 110 that flows past the venturi restriction 114 will cause a reduction in the air pressure thereabout and draw the cool gas in from the conduits 100 and 102. The conduit 116, through which the flames from the burner 108 are directed, may be considered a station of elevated temperature along the path of a heat conveying medium, such as the gas in the conduits 100, 102, and 104, or the gas along the path comprising the conduits 110, and 104. The heated gas may be used to heat a room, or some other heat utilization device 115.

A thermoelectric power generator 118 may be disposed in a portion of the path of the gas where there is a temperature gradient whose temperature increases, in the direction of flow of the gas. The thermoelectric generator 118, shown here illustratively with only two plates of dissimilar thermoelectric materials, may be positioned, by any suitable means, so that its hot end is adjacent to the conduit 116 and its cold end is adjacent to the blower 112. A pair of electrical conductors 120 and 122 may be connected to the elements of unlike thermoelectric material of the thermoelectric generator 118 at their cold ends for deriving a voltage therebetween. It will now be understood that, when the air or other gases are heated and directed in the direction shown by the arrows in FIG. 5, a voltage is developed across the conductors 120 and 122, and an equalization of temperature between the hot and cold ends of the thermoelectric unit 118 is prevented by the flow of gas from the blower 112 over and past the conduit 116 that provides the heat for the gas.

Referring, now, to FIG. 6, there is shown a thermal system 130 comprising a novel and improved arrangement of a terminal thermoelectric power generating unit 132 and and adjunctive thermoelectric power generating unit 134. The units 132 and 134 are arranged in tandem whereby a heat conveying medium, such as air, may flow from the cold end of the adjunctive thermoelectric unit 134 to the hot end thereof, and then from the hot end of the terminal thermoelectric unit 132 to the cold end thereof.

The adjunctive thermoelectric unit 134 is substantially similar to the thermoelectric unit 39, in FIG. 1, and has parallelly disposed thermoelectric elements 136p and 138n in the form of conduits of p-type and n-type materials, respectively. The elements 136p and 138n are connected to each other at their hot ends 136h and 138h by an electrical conductor 140. The cold ends 136c and 138c of the elements 136p and 138n, respectively, are connected to a conduit 142 by any suitable means, as by electrically and thermally insulating materials, in a manner whereby a heat conveying medium may flow from the conduit 142 to the conduit elements 136p and 138n.

A blower 144 is connected to the conduit 142 to blow a heat conveying medium, such as air, through the thermal system 130. The hot ends 136h and 138h of the conduit elements 136p and 138n, respectively, are connected to a conduit 146 by any suitable electrically and thermally insulating material, so that the heat conveying medium flowing through the conduit elements 136p and 138n will also flow through the conduit 146.

The terminal thermoelectric unit 132 comprises conduit elements 148p and 150n whose hot ends 148h and 150h, respectively, are connected to the conduit 146 by any suitable electrically and thermally insulating material, whereby the heat conveying medium from the conduit 146 will flow through the conduit elements 148p and 150n. The hot ends 148h and 150h of the p-type and n-type conduit elements 148p and 150n, respectively, are electrically connected to each other by an electrical conductor 152; and the cold ends 148c and 150c of the elements 148p and 150n, respectively, are embedded in a heat sink 154. The heat sink 154 is made from a good heat conductive material and is electrically insulated from the elements 148p and 150n. The heat sink 154 may have heat radiating fins 156 associated therewith to help cool the cold ends 148c and 150c of the elements 148p and 150n.

The thermoelectric elements 148p and 150n of the terminal thermoelectric unit 132 may be insulated by thermally insulating material 158 to reduce heat radiation losses. In a similar manner, the thermoelectric elements 136p and 138n of the thermoelectric unit 134 may be insulated by thermally insulating material 160 to minimize heat radiation losses.

Means are provided to heat the hot end of the adjunctive thermoelectric unit 134. To this end, any suitable heat source 162, such as an oil burner, is disposed to direct its flame adjacent to the hot end of the thermoelectric unit 134. Heat conducting fins 164 may be connected to the hot ends 136h and 138h of the elements 136p and 138n, respectively, to direct the heat from the heat source 162 to the hot end of the thermoelectric unit 134. Electrical conductors 166 and 168 are connected to the cold ends 136c and 138c, respectively, of the thermoelectric unit 134; and electrical conductors 170 and 172 are connected to the cold ends 148c and 150c, respectively, of the thermoelectric unit 132 deriving voltages from these thermoelectric units under operating conditions.

The operation of the thermal system 130 will now be described. Air from the blower 144 is directed along a confined path from the cold end of the adjunctive thermoelectric unit 134 to its hot end, and then from the hot end of the terminal thermoelectric unit 132 to its cold end. By heating the hot end of the adjunctive thermoelectric unit 134, a voltage is developed between the conductors 166 and 168. This voltage may be used by any suitable power utilization means, indicated illustratively as an electrical load 167 connected between the conductors 166 and 168.

The air flowing through the elements 136p and 138n of the adjunctive thermoelectric unit 134 will minimize the tendency for the heat to be conducted from the hot end to the cold end of this unit because the flow of the relatively cold air from the blower 144 is in a direction that is counter to the flow of heat, by conduction, along the elements 136p and 138n. In passing through the conduit elements 136p and 138n, the air is heated at the hot ends thereof and then directed, by the conduit 146, through the conduit elements 148p and 150n of the terminal thermoelectric unit 132. The heated air will heat the hot end of the terminal thermoelectric unit 132, and then give up its heat to the heat sink 154, whereby the cold end of the thermoelectric unit 132 will be relatively cold with respect to its hot end. Under these conditions, a voltage may be derived between the conductors 170 and 172 for voltage utilization means (not shown).

Referring, now, to FIG. 7, there is shown a thermoelectric system 180 wherein a plurality of adjunctive thermoelectric power generating units 182, 184, and 186 are disposed so that a heat conveying medium will flow through them in a direction to minimize heat conduction along their elements, and wherein a terminal thermoelectric power generating unit 188 is arranged to receive the heated medium that has passed through the adjunctive thermoelectric units. The adjunctive thermoelectric units 182, 184, and 186 are substantially similar to the adjunctive unit 134 described in detail with respect to FIG. 6. The terminal thermoelectric unit 188 is substantially similar in sturcture to the terminal thermoelectric unit 132 described in detail with respect to FIG. 6.

A heat conveying medium, such as air, is directed by a blower 190, through conduits communicating therewith, in the directions indicated by the arrows. Thus, the blower 190 blows air through a conduit 192 for the purpose of cooling a heat sink 194 that surrounds the cold end of the terminal thermoelectric unit 188. The conduit 192 communicates with conduits 196, 198, and 200 for the purpose of directing air through the adjunctive thermoelectric units 182, 184, and 186, respectively, in a direction from their cold ends to their hot ends. The air emerging from the thermoelectric units 182, 184, and 186 is directed through conduits 202, 204, and 206. The conduits 202, 204, and 206 communicate with each other in a manner whereby the heated air emerging from the thermoelectric units 182, 184, and 186 will be directed through the terminal thermoelectric unit 188, from the latter unit's hot end to its cold end.

A heat source 208, such as an oil burner, is provided to supply heat directly to the hot end of the adjunctive thermoelectric unit 182. Air is supplied to the heat source 208 by means of a blower 210 and a conduit 212. Fuel for the heat source 208 is supplied from a tank 214, via a conduit 216. The flame from the heat source 208 is directed over the hot end of the adjunctive thermoelectric unit 182 through a conduit 218. The conduit 218 is in a heat exchange relationship at a heat exchange station 220, with the conduit 222 carrying the heated air that has passed through the adjunctive thermoelectric units 182 and 184. The conduit 218 is also in a heat exchange relationship with the fresh air furnished to the heat source 208, via the conduit 212.

The operation of the thermal system 180 will now be described. The blowers 190 and 210 are actuated, and the flame from the heat source 208 is directed onto the hot end of the adjunctive thermoelectric unit 182. The air forced through the adjunctive thermoelectric unit 182 is heated at its hot end, and the air is then directed, via conduit 202, to the hot end of the adjunctive thermoelectric unit 184 to heat the latter. The heated air then continues to the hot end of the adjunctive thermoelectric unit 186 and then through the terminal thermoelectric unit 188. Relatively cold air passing through the adjunctive thermoelectric unit 184 is heated at its hot end and is then directed, via conduits 204 and 222, to the hot end of the adjunctive thermoelectric unit 186. Relatively cold air passing through the adjunctive thermoelectric unit 186 is heated at its hot end and is directed, via conduit 206, through the terminal thermoelectric unit 188 from its hot end to its cold end.

With the foregoing arrangement of FIG. 7, it will be noted that the hot end of the first adjunctive thermoelectric unit 182 is heated directly by the heat source 208. The air passing through the unit 182 absorbs heat at the hot end of the latter unit and then is fed directly to heat the hot end of the second adjunctive thermoelectric unit 184. The relatively cold air passing through the unit 184 absorbs heat at the hot end of the latter unit and then is fed directly to the hot end of the third adjunctive thermoelectric unit 186. The relatively cold air passing through the unit 186 absorbs heat at the hot end of the latter unit and is then directed through the terminal thermoelectric unit 188.

The heat sink 194 at the cold end of the terminal thermoelectric unit 188 should be large enough to absorb and to dissipate as much of the heat as possible so as to maintain the cold end of this unit as cool as possible. Thus, it is seen that each of the thermoelectric units 182, 184, 186, and 188 has a relatively cold end and a relatively hot end. Each of these thermoelectric units will, therefore, develop a voltage which may be derived from the electrical conductors connected to their cold ends.

While some of the thermoelectric power generating units have been shown and described as comprising a single pair of conduit elements of thermoelectric material, it will be understood that each of these units may comprise a plurality of serially connected conduit elements for more practical voltage and current parameters than are possible with only the single pair of conduit elements. Moreover, it is within the purview of the present invention to provide thermoelectric power generating units that may be wholly enclosed within the heat conveying conduits of the thermal system.

From the foregoing description, it will be apparent that there has been provided an improved arrangement of thermoelectric adjuncts in a thermal system by means of which the over-all power generating efficiency and/or practicability of the thermal system is improved. While several thermal systems according to this invention have been shown, various components useful therein, as well as variations in the systems themselves, and also other systems coming within the spirit of this invention, will, no doubt, readily suggest themselves to those skilled in the art. Hence, it is desired that the foregoing shall be considered merely as illustrative and not in a limiting sense.

What is claimed is:

1. In a system wherein a heat conveying medium is caused to flow along a predetermined path to heat utilization means, the combination therewith of means to provide a temperature gradient along a portion of said path and parallel to said path, the direction of flow of said medium being from the lower temperature directly to the higher temperature of said gradient, thermoelectric means having oppositely disposed hot and cold ends positioned in said portion of said path to develop a voltage, said thermoelectric means extending between said hot and cold ends in a direction parallel to said portion of said path so that said medium flows over said thermoelectric means directly from said cold end to said hot end, and means connected to said thermoelectric means to derive said voltage therefrom.

2. In a thermal system wherein a heat conveying medium is caused to flow along a predetermined path to heat utilization means, the combination therewith of thermoelectric means having hot and cold ends, said thermoelectric means being disposed in and extending along said path with said hot and cold ends at relatively hot and cold stations, respectively, in said system whereby to generate a voltage by said thermoelectric means, the direction of flow of said heat conveying medium being parallel to the direction said thermoelectric means extend between said hot and cold ends and from said cold end to said hot end, and means connected to said thermoelectric means to derive said voltage therefrom.

3. In a thermal system wherein a heat conveying medium is caused to flow along a path to heat utilization means, the combination therewith of means to increase the heat of said medium at a station along said path, thermoelectric means having hot and cold ends, means disposing said thermoelectric means in said path with said hot end adjacent to said station, the direction of flow of said medium being parallel to the direction said thermoelectric means extend between said hot and cold ends and from said cold end to said hot end whereby to generate a voltage by said thermoelectric means, and means connected to said thermoelectric means to derive said voltage therefrom.

4. In a thermal system wherein a heat conveying medium is caused to flow along a predetermined path to heat utilization means, the combination therewith of means at a station along said path to increase the heat of said medium, thermoelectric means having hot and cold ends, means disposing said thermoelectric means in said path with said hot end adjacent to said heating means, the direction of flow of said medium being parallel to the direction said thermoelectric means extend between said hot and cold ends and from said cold end to said hot end whereby to generate a voltage by said thermoelectric means, said thermoelectric means comprising conduits for said medium, said conduits being disposed parallel to said path, and means connected to said thermoelectric means to derive said voltage.

5. In a thermal system wherein a fluid is heated to convert it into a vapor and wherein said vapor is conducted along a path to vapor utilization means, the combination therewith of means to heat said vapor at a station along said path, thermoelectric means having hot and cold ends, means to dispose said thermoelectric means in said path with said hot end adjacent to said station, the flow of vapor along said path being parallel to the direction said thermoelectric means extend between said hot and cold ends and from said cold end directly to said hot end, and means connected to said thermoelectric means to derive a voltage therefrom.

6. A thermal system as defined in claim 5 wherein said fluid comprises water, and said vapor comprises steam.

7. In a thermal system wherein a fluid is heated in a boiler to convert it into a vapor and wherein said vapor is conducted along a predetermined path to a utilization means, the combination therewith of a conduit for said fluid comprising thermoelectric means having hot and cold ends, and means to dispose said thermoelectric means with said hot end adjacent said boiler, the direction of flow of said fluid through said conduit being parallel to the direction said thermoelectric means extend between said hot and cold ends and from said cold end to said hot end.

8. In a thermal system wherein a fluid is heated to convert it into a vapor and wherein said vapor is conducted along a predetermined path to utilization means, the combination therewith of means to increase the heat of said vapor at a station along said path, first thermoelectric means having hot and cold ends, means to dispose said first thermoelectric means in said path with said hot end adjacent to said station, the direction of flow of said vapor along said path being parallel to the direction said first thermoelectric means extend between said hot and cold ends and from said cold end directly to said hot end, second thermoelectric means having hot and cold ends, and means disposing said hot end of said second thermoelectric means adjacent to said heating means and said cold end of said second thermoelectric means adjacent to said fluid.

9. In a thermal system wherein a fluid is heated in a boiler to convert it into a vapor and wherein said vapor is conducted along a predetermined path to utilization means, the combination therewith of means to heat said vapor at a station along said path, first thermoelectric means having hot and cold ends, means to dispose said first thermoelectric means in said path with said hot end adjacent to said station, the direction of flow of said vapor along said path being parallel to the direction said first thermoelectric means extend between said hot and cold ends and from said cold end to said hot end, a second thermoelectric means having hot and cold ends, means disposing said hot end of said second thermoelectric means adjacent to said heating means and said cold end of said second thermoelectric means adjacent to said boiler, means to conduct said fluid into said boiler along a predetermined path, third thermoelectric means having hot and cold ends, and means to dispose said third thermoelectric means in said last-mentioned path with its hot end adjacent said fluid in said boiler, the direction of flow of said fluid to said boiler being parallel to the direction said thermoelectric means extend between said hot and cold ends of said third thermoelectric means and from said cold end directly to said hot end thereof.

10. In a thermal system wherein a gas is conducted along a predetermined path to gas utilization means, means to increase the heat of said gas at a station along said path, thermoelectric means having hot and cold ends, said thermoelectric means being disposed along said path with said hot end adjacent to said station to be heated by said heating means and said cold end in advance of said hot end with respect to the direction of flow of said gas along said path whereby said thermoelectric means will generate a voltage, said thermoelectric means normally conducting heat from said hot end to said cold end in a direction directly opposite to said direction of flow of said gas, and means connected to said thermoelectric means to derive said voltage therefrom.

11. A thermal system as defined in claim 9 wherein said gas comprises air.

12. In a thermal system wherein a gas is conducted along a predetermined path to gas utilization means, means to increase the heat of said gas at a station along said path, thermoelectric means having hot and cold ends, said thermoelectric means being disposed along said path with said hot end adjacent said station to be heated by said heating means and said cold end in advance of said hot end with respect to the direction of flow of said gas along said path whereby said thermoelectric means will generate a voltage, said thermoelectric means comprising spaced-apart and electrically connected thermoelectric elements through which said gas may flow, said thermo-electrical means normally conducting heat from said hot end to said cold end in a direction directly opposite to said direction of flow of said gas, and means connected to said thermoelectric means to derive said voltage therefrom.

13. In a thermal system, the combination of a first and a second thermoelectric power generator each having a hot end and a cold end, means to cause a heat conveying medium to flow in a direction from said cold end to said hot end of said first generator, in a direction directly opposite to the direction of heat normally conducted in said first thermoelectric power generator, and then from said hot end to said cold end of said second generator, and means adjacent said hot end of said first generator to heat said hot end and said medium thereat.

14. In a thermal system wherein a heat conveying medium may flow along a predetermined path to a first thermoelectric means to generate a voltage, means to increase the heat of said medium at a station along said path upstream from said first thermoelectric means, and second thermoelectric means having hot and cold ends, said second thermoelectric means being disposed in a portion of said path with said hot end adjacent said station and said cold end in advance of said hot end with respect ot the direction of flow of said medium whereby to generate a voltage, said second thermoelectric means normally conducting heat from its hot end to its cold end in a direction directly opposite to said direction of flow of said medium.

15. In a system wherein a heat conveying medium may flow along a predetermined path, means to provide a first temperature gradient along a first portion of said path, the lower temperature of said first temperature gradient being in advance of the higher temperature of said first temperature gradient with respect to the direction of flow of said medium, first thermoelectric means disposed in said first portion of said path to develop a voltage, the conduction of heat by said first thermoelectric means being normally from its hot end to its cold end in a direction directly opposite to the flow of said medium, and means to provide a second temperature gradient in a second portion of said path downstream from said first named means, the higher temperature of said second temperature gradient being in advance of the lower temperature of said second temperature gradient with respect to the direction of flow of said medium, and second thermoelectric means in said second portion disposed to generate a voltage.

16. In a system wherein a heat conveying medium may flow along a predetermined path, means to increase the temperature of said medium at a station in said path, first thermoelectric means having a hot end and a cold end, said hot end being adjacent said station and said cold end being in advance of said hot end with respect to the direction of flow of said medium, the conduction of heat by said first thermoelectric means being normally from its hot end to its cold end in a direction directly opposite to said flow of said medium, second thermoelectric means disposed in a portion of said path behind said first thermoelectric means with respect to the flow of said medium, said second thermoelectric means havin ga hot end and a cold end, said last-mentioned hot end being disposed in advance of said last-mentioned cold end with respect to the flow of said medium along said path.

17. In a thermal system wherein a heat conveying medium may flow along predetermined paths to a terminal thermoelectric unit to generate a voltage, a plurality of adjunctive thermoelectric units disposed in said paths upstream from said terminal thermoelectric unit, each of said adjunctive thermoelectric units having a hot end and a cold end and disposed with said cold end in advance of said hot end with respect to the direction of flow of said medium, and means to heat said hot ends of each of said adjunctive thermoelectric units whereby each of said adjunctive units will generate a voltage, the conduction of heat by each of said adjunctive thermoelectric units being normally from its hot end to its cold end in a direction directly opposite to said flow of said medium.

18. In a system wherein a heat conveying medium may flow along predetermined paths to a terminal thermoelectric unit, means to provide a first temperature gradient along a first portion of said paths, the lower temperature of said first temperature gradient being in advance of the higher temperature of said first temperature gradient with respect to the direction of flow of said medium, a first adjunctive thermoelectric unit disposed in said first portion to develop a voltage, means to provide a second temperature gradient along a second portion of said paths downstream from said first portion, the lower temperature of said second temperature gradient being in advance of the higher temperature of said second temperature gradient with respect to the direction of flow of said medium, a second adjunctive thermoelectric unit being disposed in said second portion of said path, the conduction of heat by each of said first and second adjunctive thermoelectric units being normally from its hot end to its cold end in a direction directly opposite to said direction of flow of said medium, said terminal thermoelectric unit having a hot end and a cold end and being disposed downstream from said second adjunctive thermoelectric unit, said terminal thermoelectric unit being disposed in said path so that said medium flows in a direction from the hot end of said terminal thermoelectric unit to the cold end thereof, and a heat sink disposed at said last-mentioned cold end.

References Cited in the file of this patent
UNITED STATES PATENTS

| | | |
|---|---|---|
| 2,675,417 | Heibel | Apr. 13, 1954 |
| 2,678,092 | Ray | May 11, 1954 |
| 2,779,172 | Lindenblad | Jan. 29, 1957 |